United States Patent [19]

Armstrong

[11] Patent Number: 5,853,217
[45] Date of Patent: *Dec. 29, 1998

[54] QUICK DETACHABLE MOTORCYCLE WINDSHIELD

[75] Inventor: Jeffrey L. Armstrong, Fredonia, Wis.

[73] Assignee: Harley-Davidson Motor Company, Milwaukee, Wis.

[*] Notice: The term of this patent shall not extend beyond the expiration date of Pat. No. 5,658,035.

[21] Appl. No.: 858,588

[22] Filed: May 19, 1997

Related U.S. Application Data

[63] Continuation of Ser. No. 365,283, Dec. 28, 1994, Pat. No. 5,658,035.

[51] Int. Cl.⁶ ........................................ B62J 17/04
[52] U.S. Cl. ................................................ 296/78.1
[58] Field of Search ............................. 296/78.1, 96.21, 296/96.22

[56] References Cited

U.S. PATENT DOCUMENTS 5,658,035  8/1997  Armstrong ............................ 296/78.1

FOREIGN PATENT DOCUMENTS 60807  9/1982  European Pat. Off. .

*Primary Examiner*—Andrew C. Pike
*Attorney, Agent, or Firm*—Michael, Best & Friedrich LLP

[57] ABSTRACT

A motorcycle comprises a frame assembly, a wheel rotatably mounted to the frame assembly for rotation about a lateral axis and within a vertical plane, two mounting bosses mounted to the frame assembly, and a windshield assembly having two sockets (e.g., substantially U-shaped and defined by two brackets) mounted to the mounting bosses. One mounting boss extends laterally from the assembly in a first direction, and the other mounting boss extends laterally from the assembly in a second direction substantially opposite the first direction. The sockets are open ended in the vertical plane to allow the windshield assembly to be removed from the mounting bosses by moving the windshield assembly in the vertical plane.

16 Claims, 2 Drawing Sheets

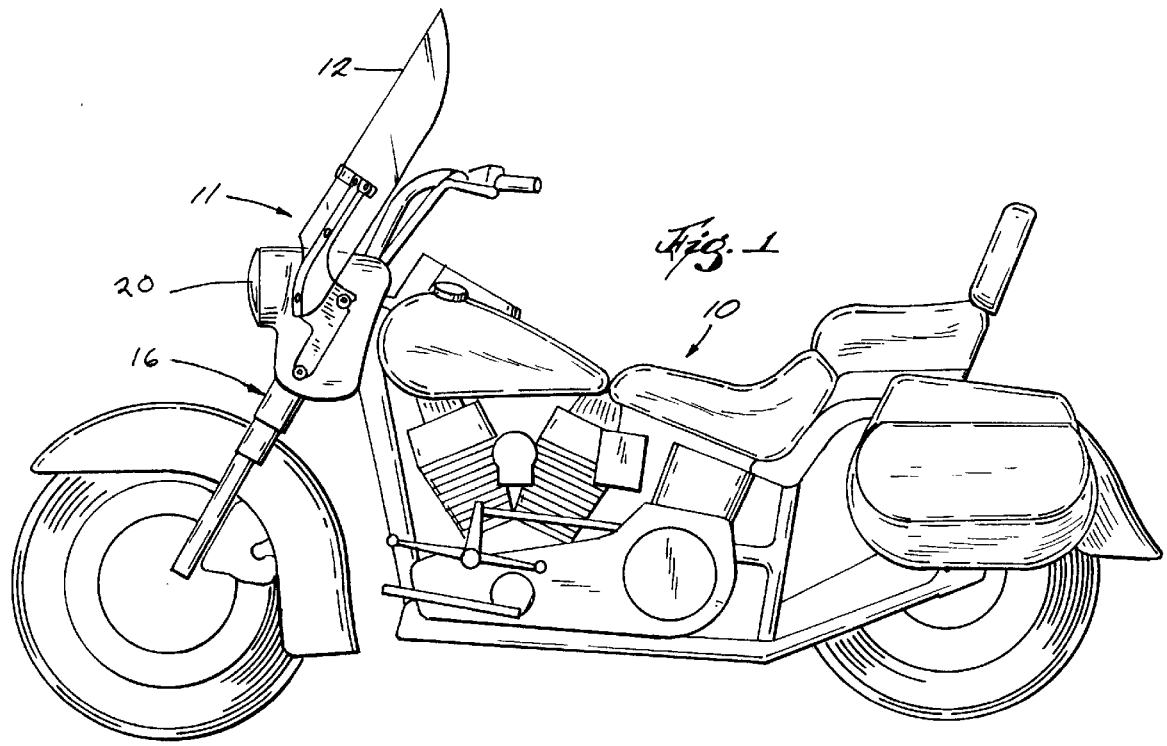
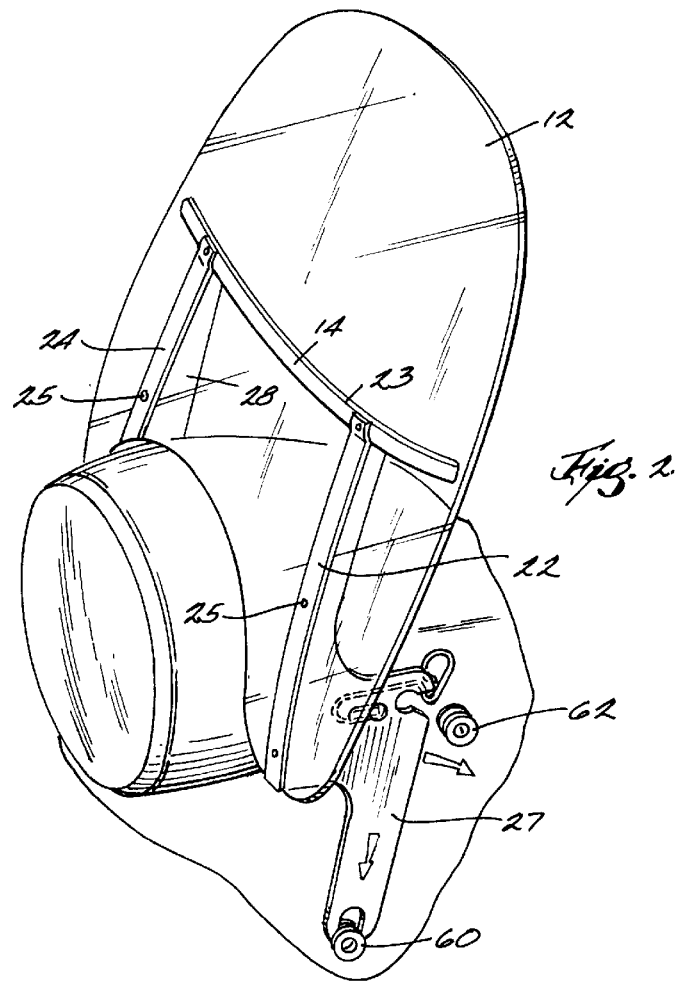

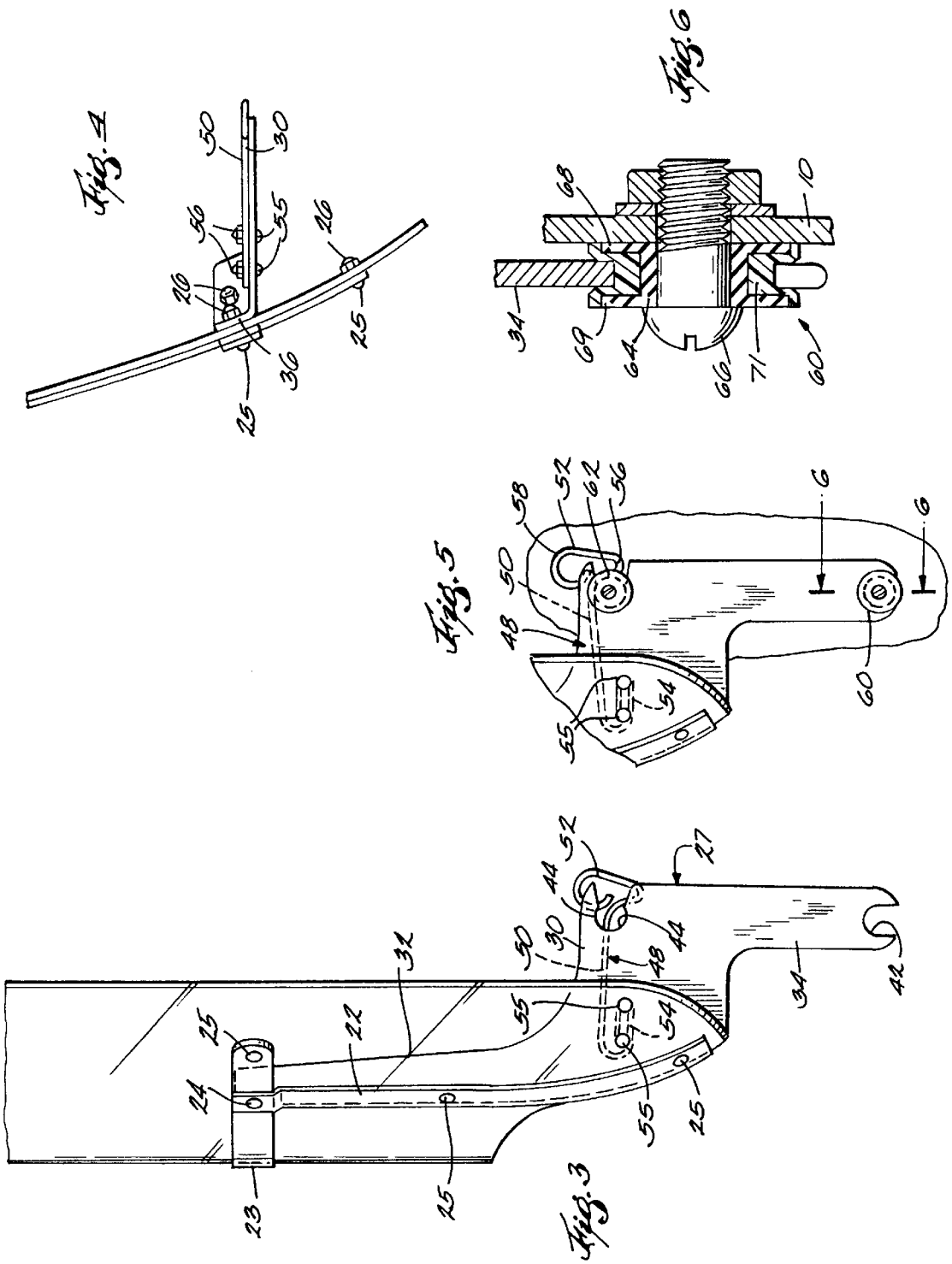

QUICK DETACHABLE MOTORCYCLE WINDSHIELD

REFERENCE TO RELATED APPLICATIONS

This is a continuation application of U.S. application Ser. No. 08/365,283, filed Dec. 28, 1994, entitled QUICK DETACHABLE MOTORCYCLE WINDSHIELD, which issued as U.S. Pat. No. 5,658,035 on Aug. 19, 1997.

BACKGROUND OF THE INVENTION

This invention relates to motorcycles and more particularly to a quick detachable motorcycle windshield.

The use of motorcycle windshields is desirable for long distance highway travel to minimize fatigue caused by windloading on the rider's exposed upper body. On the other hand, many motorcycle riders prefer not to employ a windshield for short trips or lower speed street travel. However, because the installation and removal of prior art windshields was normally time-consuming and required the use of tools, rapid conversion was normally not a viable option. For example, motorcycle windshields were typically bolted to the vehicle and in some models, several other components had to be removed to permit removal or installation of the windshield. Moreover, in some cases, removal of the windshield exposed unsightly hardware or brackets which remained on the vehicle. Some vehicles also required the installation of spacers to fill the space previously occupied by the windshield.

SUMMARY OF THE INVENTION

The present invention provides a motorcycle comprising a frame assembly a wheel rotatably mounted to the frame assembly for rotation about a lateral axis and within a reference plane, two mounting bosses mounted to the frame assembly, and a windshield assembly having two sockets (e.g., substantially U-shaped and defined by two brackets) detachably engaged with the mounting bosses. One mounting boss extends laterally from the assembly in a first direction, and the other mounting boss extends laterally from the assembly in a second direction substantially opposite the first direction. The sockets are open ended in the reference plane to allow the windshield assembly to be removed from the mounting bosses by moving the windshield assembly in the reference plane.

Preferably, each mounting boss includes an elastomer member engaged with one of the brackets. Each mounting boss can further includes a rigid insert supporting the elastomer member. The elastomer members preferably are dimensioned to be compressed when the sockets are engaged with the mounting members.

In one embodiment, the motorcycle includes two mounting bosses on each side, and each side of the windshield assembly includes two open-ended sockets adapted to receive the corresponding mounting bosses. The windshield assembly can further include a movable latch adapted to engage a portion of the motorcycle (e.g., a mounting boss).

The present invention also provides a novel method of mounting a windshield assembly on a motorcycle. The windshield assembly includes brackets defining open-ended sockets, and the frame includes a frame assembly and a wheel rotatably mounted to the frame assembly for rotation about a lateral axis and within a reference plane. The method comprising the steps of attaching mounting bosses to the frame assembly, aligning the sockets of the windshield assembly with the mounting bosses, and moving the windshield assembly in a direction within the reference plane until the sockets engage the bosses. Preferably, the attaching step includes the step of securing a mounting boss to each side of the frame assembly. In one embodiment, the frame assembly includes a frame and a fork rotatably mounted to the frame, and the attaching step includes the step of securing mounting bosses to the fork.

BRIEF DESCRIPTION OF THE DRAWINGS

FIG. 1 is a side elevation view of a motorcycle having a quick detachable windshield according to the invention;

FIG. 2 is a perspective view of a portion of the motorcycle shown in FIG. 1;

FIG. 3 is a side view of the motorcycle windshield according to the invention;

FIG. 4 is a top view of the motorcycle windshield shown in FIG. 3;

FIG. 5 is a fragmentary view of a portion of the motorcycle shown in FIG. 1; and FIG. 6 is a section view taken along lines 6—6 of FIG. 5.

DETAILED DESCRIPTION

FIG. 1 shows a conventional motorcycle 10 having a quick detachable windshield assembly 11 according to the preferred embodiment of the invention. The motorcycle 10 also has a front wheel attached to a motorcycle frame assembly for rotation about a lateral axis of rotation. The windshield assembly, as shown more particularly in FIGS. 2, 3, and 4, includes a windshield 12 formed of any suitable transparent, shatter-resistant material. A generally rectangular cutout 14 is formed in the lower edge of the windshield 12 so that it fits over the front fork 16 and the headlight 20 of the motorcycle 10. The cutout 14 is framed by braces 22,23,24, which are suitably secured to the windshield 12 by screws 25 and nuts 26.

The windshield assembly 11 also includes brackets 27,28 fixed on opposite sides of the windshield 12 to the braces 22,23,24, with the bracket 27 being a mirror image of bracket 28. In particular, each bracket 27,28 includes an upper portion 30, an arm 32 extending upwardly from the forward edge of the upper portion 30, and a lower portion 34 extending downwardly from the rear edge of upper portion 30. A thin flange 36 is formed along the forward edge of the arm 32 and the upper portion 30, and extends at an angle relative thereto. The flanges 36 of each bracket 27,28 are attached to the rear surface of the windshield and in an opposed relation to the braces 22,24, respectively, by means of the screws 25 and nuts 26, which also secure the braces 22,24.

A generally U-shaped first socket 42 is formed at the lower end of the lower portion 34 and faces downwardly, opening in a direction perpendicular to the axis of rotation of the front wheel. A generally U-shaped second socket 44 is formed at the upper rear of upper portion 30 and opens rearwardly. A latch 48 is mounted adjacent to each of the second sockets 44, and each latch 48 consists of a heavy gauge wire spring bent to define a stem 50 and a head 52. A first oval loop 54 is formed at the base of the stem 50 for receiving a pair of screws 55, each of which also passes through one of a pair of spaced apart openings in the brackets 27,28. Each screw 55 is threadably received in a nut 56 to secure the latches 48 in position. The head 52 of each latch 48 is formed with a downwardly extending, U-shaped loop 56 and upwardly extending loop 58. When the spring latches 48 are unflexed, the legs 56 extend downwardly across the open end of the sockets 44.

A pair of bushings, or mounting bosses, 60,62 are mounted at each side of the motorcycle 10 and are spaced apart the same distance as that between the sockets 42,44. The bushings 60,62 extend in a direction substantially parallel to the axis of rotation of the front wheel. Each bushing 60,62 is shown in FIG. 6 to comprise an elastomer member 64 having a central opening for receiving a screw 66 which secures the bushing to the motorcycle 10, and having a pair of radially extending flanges 68,69. In addition, an annular metallic or plastic insert 71 is disposed between the flanges 68,69 for being engaged by the socket 42,44.

In order to mount the windshield assembly 11 on the motorcycle 10, the assembly is positioned with the sockets 42 on the lower ends of the each of the brackets 27,28 located above the lower bushings 60. The width of each socket 42 is sufficient to embrace the metallic inserts 71. The assembly is lowered until the upper margin of the sockets 42 engage one of the lower bushings 60. The assembly is then rotated clockwise about an axis of rotation that is parallel to the axis of rotation of the front wheel as viewed in FIG. 2, and the latches 48 are flexed upwardly to move the legs 56 away from the open ends of the sockets 44. Continued rotation of the assembly moves the sockets 44 into engagement with the upper bushings 62. When the sockets 44 are fully seated, the latches 48 are released to lock the windshield assembly 11 in position. The elastomer members 64 are compressed slightly when the brackets 27,28 are mounted on the vehicle to help retain the brackets 27,28 in position.

When it is desired to remove the windshield assembly 11 from the motorcycle 10, the latch springs 48 at the opposite sides of the vehicle are flexed upwardly thereby moving the legs 56 away from the open end of the sockets 44. This permits the assembly 11 to be pivoted counterclockwise as viewed in FIG. 2, and then elevated in a direction perpendicular to the axes of rotation of the front wheel and of the assembly 11 to move the sockets 42 away from the lower bushing 60. It can thus be seen that the windshield assembly 11 can be mounted on and removed from the motorcycle 10 quickly and without the requirement for tools.

While only a single embodiment of the invention has been illustrated and described, it is not intended to be limited thereby but only by the scope of the appended claims.

What is claimed is:

1. A detachable motorcycle windshield assembly adapted to be mounted onto a motorcycle, said windshield assembly comprising:
   a windshield;
   a first socket attached to said windshield, said first socket opening substantially downward relative to an orientation of said assembly on the motorcycle; and
   a second socket attached to said windshield, said second socket opening substantially rearward relative to an orientation of said assembly on the motorcycle.

2. A detachable motorcycle windshield assembly as claimed in claim 1, wherein said first socket is generally U-shaped.

3. A detachable motorcycle windshield assembly as claimed in claim 1, further comprising a bracket attached to said windshield, said bracket including said first socket and said second socket, and wherein the motorcycle has a mounting boss, and wherein said first socket is adapted to receive the mounting boss.

4. A detachable motorcycle windshield assembly as claimed in claim 1, further comprising a latch movably mounted and adapted to engage a portion of the motorcycle.

5. A detachable motorcycle windshield assembly as claimed in claim 4, wherein the motorcycle includes a mounting boss, and wherein said latch is adapted to engage the mounting boss.

6. A motorcycle comprising:
   a frame assembly;
   a wheel mounted on said frame assembly for rotation about a lateral axis;
   a windshield;
   an upper mounting means for connecting said frame assembly to said windshield, said upper mounting means including:
     an upper boss connected to one of said frame assembly and said windshield and extending in a direction substantially parallel to the lateral axis; and
     an upper open-ended socket that is connected to another of said frame assembly and said windshield; and
   a lower mounting means for connecting said frame assembly to said windshield, said lower mounting means including:
     a lower boss connected to one of said frame assembly and said windshield and extending in a direction substantially parallel to the lateral axis; and
     a lower open-ended socket that is connected to another of said frame assembly and said windshield, said lower open-ended socket opening in a direction perpendicular to the lateral axis.

7. A motorcycle as claimed in claim 6, further comprising:
   a bracket defining said upper open-ended socket and said lower open-ended socket, and wherein each of said upper boss and said lower boss includes a groove engaged with one of said upper open-ended socket and said lower open-ended socket.

8. A motorcycle as claimed in claim 7, wherein each of said upper boss and said lower boss includes an elastomer member engaged with one of said upper open-ended socket and said lower open-ended socket.

9. A motorcycle as claimed in claim 8, wherein each of said upper boss and said lower boss further includes a rigid insert supporting said elastomer member.

10. A motorcycle as claimed in claim 8, wherein said elastomer members are sized to be compressed when said sockets are engaged with said upper boss and said lower boss.

11. A method of mounting a windshield assembly on a motorcycle, the windshield assembly having a first lower socket and a second lower socket attached to the windshield, the first and second lower sockets opening substantially downward relative to an orientation of the assembly on the motorcycle, and a first upper socket and a second upper socket attached to the windshield, the first and second upper sockets opening substantially rearward relative to the orientation of the assembly on the motorcycle, the motorcycle having a wheel mounted on the motorcycle for rotation about a lateral axis, said method comprising the steps of:
   (a) attaching a first lower mounting boss and a second lower mounting boss to the motorcycle;
   (b) attaching a first upper mounting boss and a second upper mounting boss to the motorcycle;
   (c) engaging the first and second lower sockets of the windshield assembly with the first and second lower mounting bosses, respectively by moving the windshield assembly downward relative to the mounting bosses; and
   (d) rotating the windshield assembly about an axis that is parallel to the lateral axis until the first and second upper sockets engage the first and second upper bosses, respectively.

12. A method as claimed in claim 11, wherein the motorcycle includes a frame assembly having first and second opposite sides, and wherein said attaching step (a) of said lower bosses includes securing the first lower mounting boss to the first side, and securing the second lower mounting boss to the second side of the frame assembly.

13. A method as claimed in claim 12, wherein the frame assembly includes a frame and a fork rotatably mounted to the frame, and wherein the fork includes the first and the second opposite sides, and wherein said attaching step (a) of said lower bosses further includes securing the first and second lower mounting bosses to the first and second sides of the fork, respectively.

14. A detachable windshield assembly for use with a motorcycle, the motorcycle having a first mounting boss, a second mounting boss, and a wheel rotatable about an axis of rotation, said windshield assembly comprising:

a windshield having a first portion and a second portion;

a first bracket attached to said first portion of said windshield, said first bracket having an upper portion defining a first upper open-ended socket and a lower portion defining a first lower open-ended socket; and a second bracket attached to said second portion of said windshield, said second bracket having an upper portion defining a second upper open-ended socket and a lower portion defining a second lower open-ended socket; wherein said first lower open-ended socket is sized to engage the first mounting boss and said second lower open-ended socket is sized to engage the second mounting boss such that said first and second lower open-ended sockets contact the first and second mounting bosses when said windshield assembly is installed on the motorcycle; and wherein said first and second lower open-ended sockets may be separated from the first and second mounting bosses by moving said assembly in a direction perpendicular to the axis of rotation.

15. A windshield assembly as recited in claim 14, further comprising a first latch assembly movably mounted on said first bracket and adapted to engage a portion of the motorcycle, and a second latch assembly movably mounted on said second bracket and adapted to engage a portion of the motorcycle.

16. A windshield assembly as recited in claim 15, wherein the motorcycle further includes first and second bushings independent of the first and second mounting bosses, and wherein each of said first latch and said second latch is adapted to engage one of the first and second bushings.

* * * * *

UNITED STATES PATENT AND TRADEMARK OFFICE
CERTIFICATE OF CORRECTION

PATENT NO : 5,853,217

DATED : December 29, 1998

INVENTOR(S) :

It is certified that error appears in the above-identified patent and that said Letters Patent are hereby corrected as shown below:

Add the following references cited:

U.S. Patent Document

| Document No. | Date | Name | Class | Subclass |
|---|---|---|---|---|
| 2,903,297 | 9/59 | Zbikowski | 296 | 78.1 |
| 4,082,345 | 4/78 | Willey | 296 | 78.1 |
| 4,226,463 | 10/80 | Gager, Jr. | 296 | 78.1 |
| 4,615,556 | 10/86 | Stabel | 296 | 78.1 |

Foreign Patent Documents

| Document No. | Date | Country | Class | Subclass |
|---|---|---|---|---|
| 60807 | 9/82 | Europe | | |
| 827330 | 2/60 | United Kingdom | | |

Column 2, Line 61 insert "-" between --spaced apart--.

Signed and Sealed this

Twenty-fifth Day of July, 2000

Attest:

Q. TODD DICKINSON

*Attesting Officer*          *Director of Patents and Trademarks*